July 20, 1926.
R. NARDI
1,593,347
MAGAZINE PENCIL
Filed Feb. 11, 1926
3 Sheets-Sheet 2
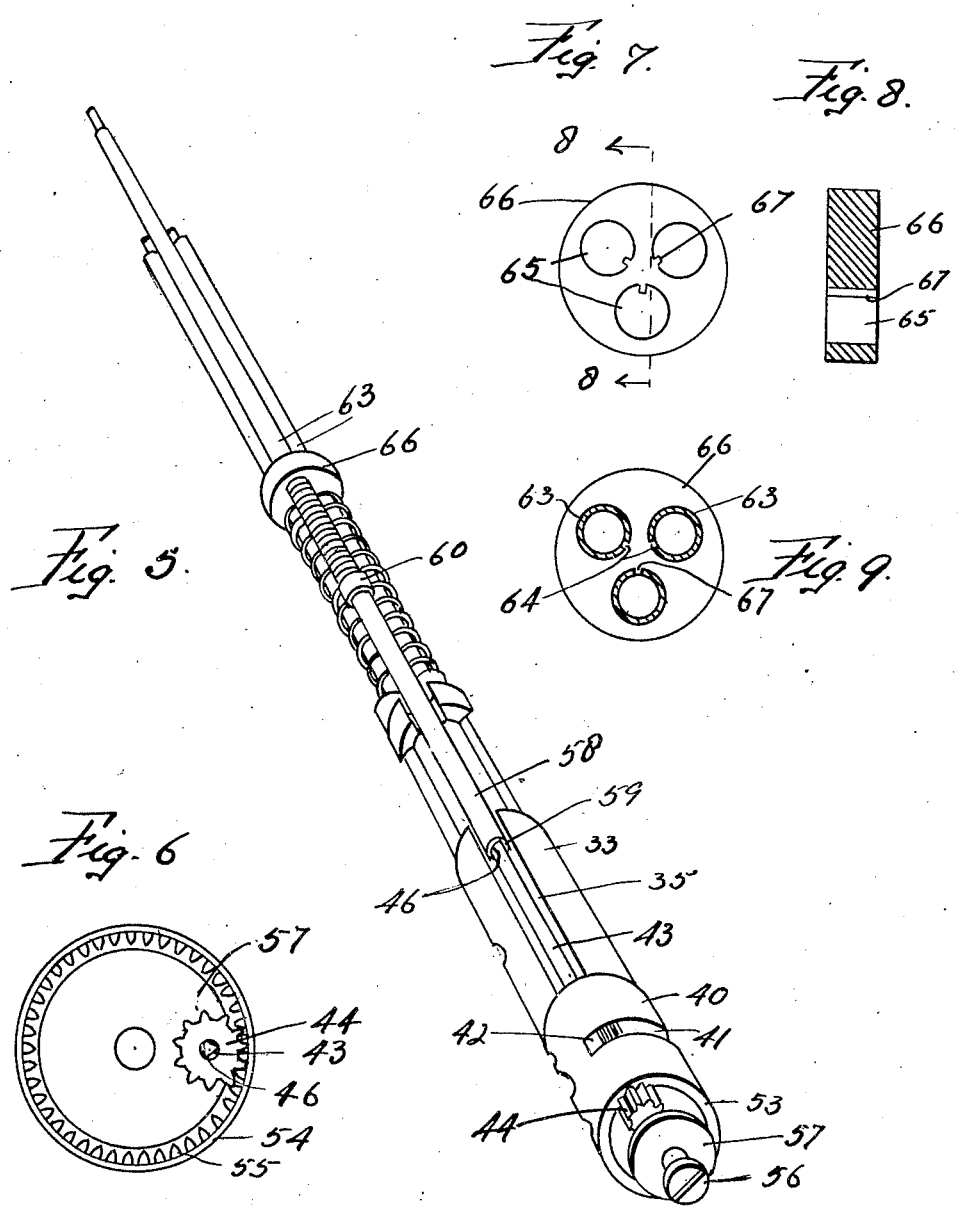
INVENTOR
Romolo Nardi
By W. W. Williamson Atty.

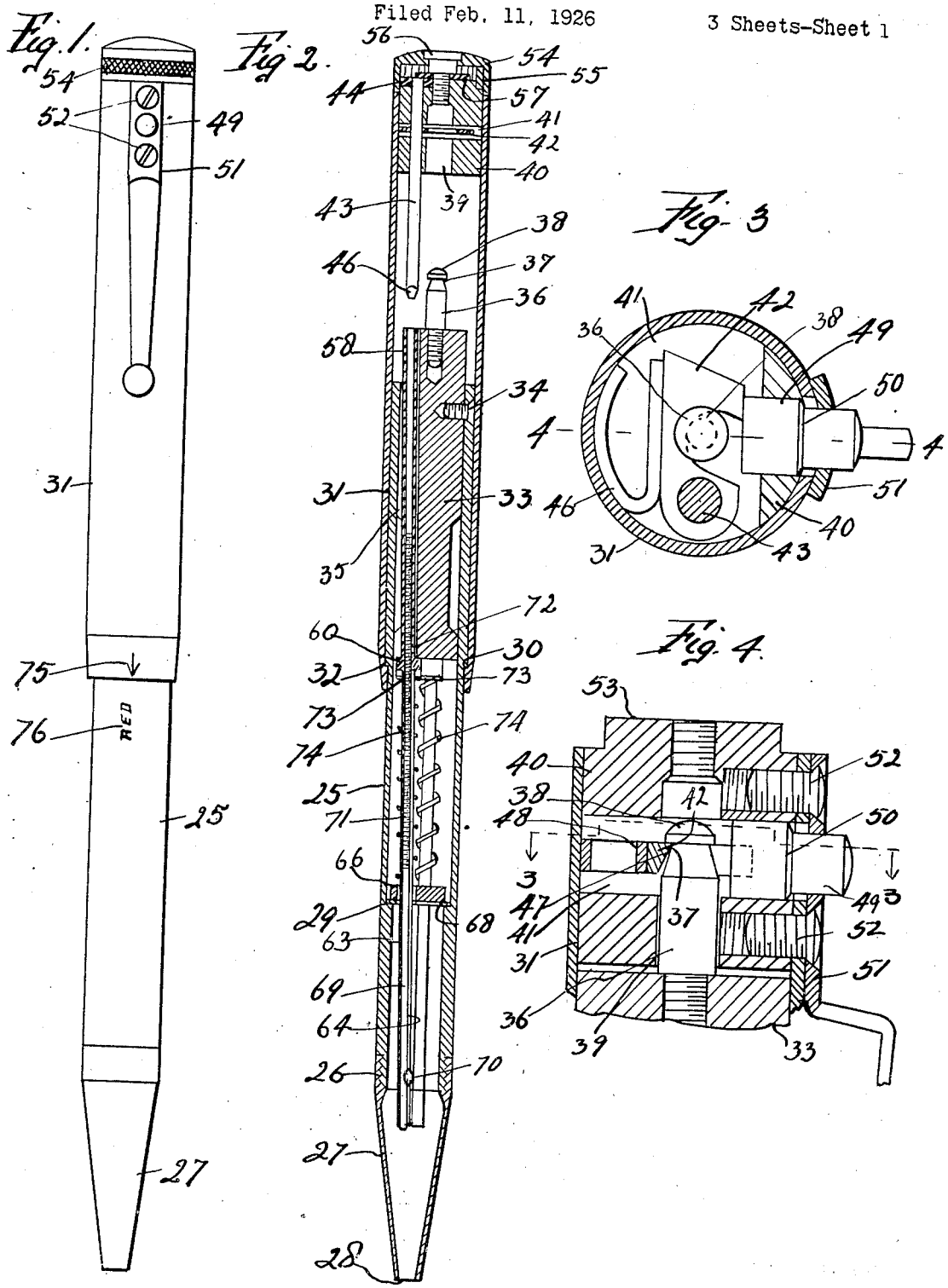
July 20, 1926.
R. NARDI
MAGAZINE PENCIL
Filed Feb. 11, 1926
1,593,347
3 Sheets-Sheet 1
INVENTOR
Romolo Nardi
By W. W. Williamson, Atty.

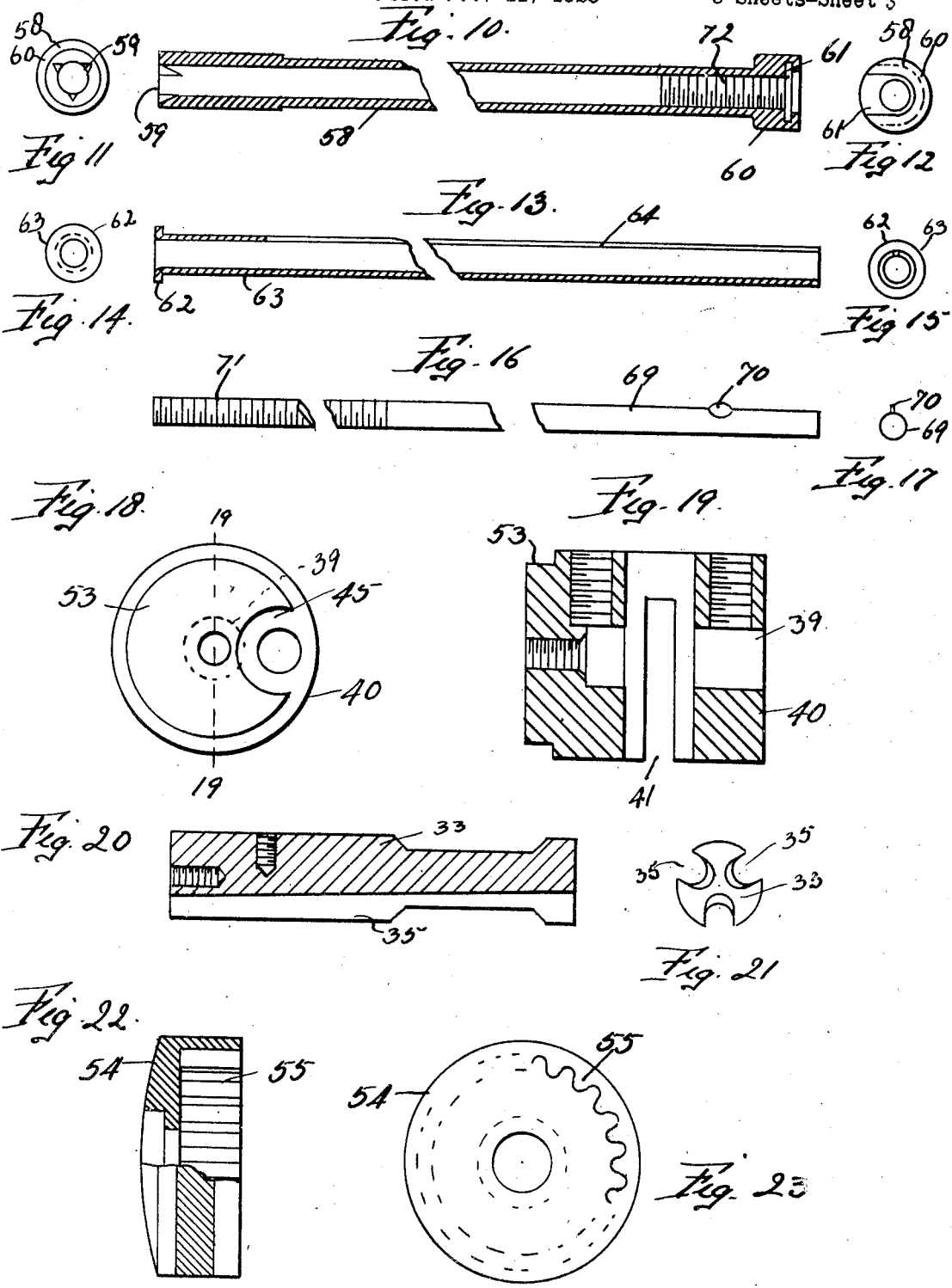

Patented July 20, 1926.

1,593,347

UNITED STATES PATENT OFFICE.

ROMOLO NARDI, OF CAMDEN, NEW JERSEY.

MAGAZINE PENCIL.

Application filed February 11, 1926. Serial No. 87,534.

My invention relates to new and useful improvements in a magazine pencil, and has for its primary object to improve the construction of a similar pencil, for which application for United States Letters Patent was filed December 9, 1924, bearing Serial Number 754,736.

Another object of the invention is to provide a unique method of locking the telescoping casing members in a collapsed position, the locking means including a releasing element, which when pressed upon, will unlock the parts.

A further object of the invention is to so construct the several parts of the pencil as to eliminate the necessity of soldering certain of the parts to each other.

A still further object of the invention is to provide for an easy and quick assembly of the several parts.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a side elevation of a pencil embodying my invention with the parts illustrated in the positions assumed when the pencil is not in use.

Fig. 2, is a longitudinal sectional view thereof with some of the small parts shown in elevation.

Fig. 3, is an enlarged sectional view at the line 3—3 in Fig. 4.

Fig. 4, is an enlarged sectional view at the line 4—4 of Fig. 3.

Fig. 5, is a perspective view of the magazine unit and the operating unit removed from the casing and shown in their relative positions when one of the leads is projected for use.

Fig. 6, is an inner face view of the combined cap and ring gear showing its relation to the pinion and ejector, which latter is shown in section.

Fig. 7, is a face view of the guide for the lead holders.

Fig. 8, is a section at the line 8—8 of Fig. 7.

Fig. 9, is a view similar to Fig. 7 with sections of the lead holders shown in the guide apertures.

Fig. 10, is a longitudinal sectional view of one of the barrels between a lead holder and the operating mechanism.

Fig. 11, is a view of one end thereof.

Fig. 12, is a view of the other end thereof.

Fig. 13, is a longitudinal sectional view of one of the lead holders.

Fig. 14, is a view of one end thereof.

Fig. 15, is a view of the other end of the same.

Fig. 16, is a side elevation of the lead propelling rod.

Fig. 17, is an end view thereof.

Fig. 18, is an end view of the holder for the locking mechanism, and portions of the lead propelling and ejecting means.

Fig. 19, is a section at the line 19—19 of Fig. 18.

Fig. 20, is a longitudinal sectional view of the magazine unit frame.

Fig. 21, is an end view thereof.

Fig. 22, is a sectional side elevation of the combined cap and ring gear.

Fig. 23, is an inner face view thereof.

In carrying out my invention as herein embodied, 25 represents the lower pencil casing showing its lower end reduced, as at 26, for threaded engagement with the tapered or conical ferrule 27, which is provided with a restricted opening or outlet 28. Intermediate the ends of the lower pencil casing is an internal shoulder 29, and between said internal shoulder and the inner end of said casing is an external shoulder 30. Said lower casing is telescopically and rotatably mounted in the upper casing 31, provided with an internal shoulder 32 at its inner end for coaction with the shoulder 30 to limit the movements of the casings relative to each other in one direction.

Within the inner end of the lower pencil casing is fixed a frame 33, by means of a screw 34 or its equivalent and said frame, as plainly shown in Fig. 20, is provided with a plurality of longitudinal slots 35 which are inclined relative to the longitudinal center of the frame so that they converge toward the inner or lower end of said frame. In the upper end of the frame is mounted a locking pin 36 fashioned to provide a neck 37 and an oval head 38.

The frame being fixed to he lower pencil casing, as the latter is telescoped, collapsed or moved longitudinally relative to the upper pencil casing 31, the locking pin will enter the central opening 39 in the holder 40, which is fixed in the upper end of the upper pencil casing, and when the head and neck thereof are within the lateral slot 41 in said holder it will be engaged by the clutch member 42 pivoted within said slot by means of the ejector pin 43, which also acts as a shaft for the pinion 44 lying within a depression 45 in the outer end of the holder 40 and the inner end of said ejector pin is of polygonal shape as at 46 for a purpose to be later described.

The clutch 42 is provided with a bevelled nose 47 so as to be oscillated in one direction as the head of the locking pin is forced past the clutch, and said nose being returned to its normal position by means of the spring 48 so as to engage beneath the head of the locking pin in the region of its neck, as plainly shown in Fig. 4. In order to release the clutch from the locking pin, I provide a push button 49 passing thru holes in the upper pencil casing and the holder so as to communicate with the lateral slot 41, and this push button has its outer end reduced so as to form a shoulder 50 for coaction with the clip 51 which has a hole of smaller diameter than the inner end of said push button. This clip acts as a clamp for holding the pencil in a pocket of a user's clothing, and is fastened on the pencil by means of screws 52, or their equivalent, passing thru said clip, the upper pencil casing and threaded into the holder 40. By pressing inward upon push button 50, which is in engagement with the clutch, said clutch will be moved against the action of the spring 48 and the locking pin will be released.

The outer end of the holder 40 is provided with a reduced extension 53, over which is placed the rotating cap 54 having an internal or ring gear 55 formed as a part thereof for coaction with the pinion 44, and said cap is rotatably mounted by means of the shouldered screw 56 having threaded connection with the holder 40, and a washer 57 preferably surrounds the screw 56 and engages the pinion 44 to retain it within the depression 45.

In each of the longitudinal slots 35 in the frame 33 is slidably mounted a barrel 58, Fig. 10, having a polygonal opening 59 at the upper or outer end for coaction with the polygonal terminal 46 of the ejector pin 43, and as here shown this polygonal opening is of triangular shape, and is formed by distorting the end of said barrel. The other end of the barrel is provided with an enlargement 60 in which is formed the side opening socket 61, to receive the flange 62 on the coacting end of the lead holder or carrier 63 which has a longitudinal slot 64 running from its lower end to within a short distance of its upper end so that said slot extends over the major portion or nearly the entire length of the lead carrier; the lead carrier projects from the barrel thru one of the holes 65 in the guide disc 66 with its slot in registration with the tongue 67 projecting into the hole 65, thru which it passes, said tongue being carried by, but preferably formed as a part of the guide disc. The guide disc is mounted to rest against a washer 68 within the lower pencil casing and in engagement with the shoulder 29. The washer 68 has a large opening thru it, but snugly fits the pencil casing while the guide disc is of smaller diameter than the interior of the pencil casing, and when occasion requires, may move about over the washer so as to align the outer end of lead carrier with the outlet 28.

A lead propelling rod 69 has a fin 70 set up therefrom for registration with the slot 64 in the lead carrier 63, and the inner end of said propelling rod is threaded, as at 71, for threaded connection with the interior threaded portion 72 of the barrel 58.

On each lead carrier or holder is a washer 73 which underlies the enlargement 60 of a coacting barrel 58 and against said washer rests one end of a spring 74; the other end resting against the guide disc 66.

From the foregoing description, it is to be particularly noted that when it is desired to use the lead carried by any one of the lead carriers or holders the upper and lower pencil casings are rotated relative to each other until the barrel of the respective lead carrier aligns with the ejector pin 43, and this may be denoted by an indication mark 75, such as an arrow, on the upper pencil casing and one of a plurality of indication marks 76 on the lower pencil casing, it being understood that there is an indication mark 76 for each of the lead holders so that where there are three lead holders, there are three of these indication marks disposed equally about the pencil casing, and as a pencil of this character is especially adapted to the use of differently colored leads, the indication marks 76 may be words representing the different colors. When the barrel associated with the carrier of the desired lead is in alignment with the ejector pin 43, the casing members of the pencil are telescoped or collapsed until the locking pin 36 engages with the clutch to retain the pencil casings in telescoped condition. During this operation the upper end of that barrel which is aligned with the ejector pin is arrested in its movement by said ejector pin while the frame 33 with the lower pencil casing continues its movement relative to the upper pencil casing, and therefore said lead carrier will be projected thru the outer opening 28 so as to expose the lead carried thereby for use. Should the lead break off while being used, it is only necessary to rotate the cap 54, and thru the medium of its ring gear 55, the pinion 44 will be revolved to transmit a like motion to the ejector pin 43, and since the polygonal terminal 46 of said ejector pin is within the polygonal opening 59 of the barrel, the latter will be revolved in the proper direction to screw the lead propelling rod outward since it is held against rotation by the fin 70 within the slot of the lead carrier 63, and the latter is also held against rotation by registration of its slot with a tongue 67 in the guide disc. The screwing of the lead propelling rod outward will push the lead in front of it until it projects the desired distance from its carrier.

To withdraw the lead carrier and the lead therein, the clutch 42 is released by pressing inward on the push button 49, at which time the spring about the carrier of the lead which was in use, and which was compressed, will expand and return the associated barrel to its normal position, and because of its cooperation with the ejector pin 43, will move the pencil casings apart or outward relative to each other, and after this has been done the casings may be rotated relative to each other in order to select another lead for use.

Of course I do not wish to be limited to the exact details of construction as herein shown as these may be varied within the limits of the appended claims without departing from the spirit of my invention.

Having thus fully described my invention, what I claim as new and useful is:

1. A magazine pencil including telescoping casing members, a frame fixed within one of said members, a holder fixed in the other member, a locking member carried by the frame, means carried by the holder and engageable with the locking means to hold the casing members in telescoped condition; a plurality of lead carriers slidably mounted relative to the frame, means to normally hold said carriers in one position, means projecting from the holder to engage a lead carrier and arrest its movement as the casing members are telescoped.

2. The structure set forth in claim 1 wherein the locking means comprise a spring actuated clutch pivoted on the means which project from the holder to arrest the movement of the lead carriers and a push button slidably mounted in one of the casing members for coaction with the clutch to move it against the action of the spring.

3. A magazine pencil including a telescoping casing, a plurality of lead carriers within the casing, barrels rotatably connected with the carriers, lead propelling rods having threaded connection with the barrels and projecting into the carriers, means to selectively project the carriers into operative positions thru the medium of the barrels, and mechanism for transmitting rotary motion to said means to revolve the barrel with which it is in engagement, whereby the lead propelling rod will be moved longitudinally.

4. In a magazine pencil, a magazine unit including a frame having a plurality of longitudinal slots arranged at angles to the longitudinal center of said frame, barrels having side opening sockets and provided with internal threads, lead carriers having flanges for insertion in the sockets and provided with longitudinal slots, a guide disc provided with holes for the passage of the lead carriers, tongues projecting into said holes for registration with the slots in the carriers, lead propelling rods within the carriers and projecting into the barrels with which they have threaded connection, fins on said rods for registration with the slots in the carriers, washers on the carriers adjacent their flanges and springs coiled about the carriers and engaging the washers on the latter and the guide disc.

5. The structure set forth in claim 4 in combination with a lower casing in which said unit is mounted, said casing having an internal shoulder, a washer between said shoulder and the guide disc of the unit, means passing thru the casing and into the frame to fix the unit in said casing, a tapered ferrule on the outer end of the casing, an external shoulder on said casing, an upper casing telescoping over the lower casing and provided with an internal shoulder at its inner end for coaction with the external shoulder on the lower casing to limit the movements in one direction of said casings relative to each other, a holder fixed within the outer end of the upper casing, a spring actuated clutch, an ejector pin having a polygonal point for coaction with a polygonal opening or socket at the end of each of the barrels, a pinion fixed to said ejector pin, a cap having an interior or ring gear meshing with the pinion, means passing thru the cap and into the holder for rotatably mounting the cap on the end of the upper pencil casing, a washer between said means and pinion, a locking pin carried by the frame for coaction with the clutch when the upper and lower casings are telescoped, a push button passing thru the casing and into the holder for coaction with the clutch and opposed to the clutch spring, said push button having a shoulder, a clip, and means to fasten said clip to the upper casing in the region of the push button for engagement with the shoulder thereof to prevent accidental displacement of said push button.

In testimony whereof, I have hereunto affixed my signature.

ROMOLO NARDI.